United States Patent
Ilhoshi et al.

(10) Patent No.: US 7,556,023 B2
(45) Date of Patent: Jul. 7, 2009

(54) CONTROL DEVICE FOR HIGH-PRESSURE FUEL SYSTEM

(75) Inventors: Yoichi Ilhoshi, Tsuchiura (JP); Yoshikuni Kurashima, Mito (JP); Toshio Hori, Hitachinaka (JP); Shin Yamauchi, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/969,460

(22) Filed: Jan. 4, 2008

(65) Prior Publication Data

US 2008/0236548 A1   Oct. 2, 2008

(30) Foreign Application Priority Data

Mar. 26, 2007   (JP)   ............................. 2007-078117

(51) Int. Cl.
 *F02D 41/38* (2006.01)
 *F02M 51/00* (2006.01)
(52) U.S. Cl. ...................... 123/480; 123/478; 123/472; 123/445; 123/434; 123/508; 123/456
(58) Field of Classification Search ................. 123/446, 123/456, 472, 475, 478, 480, 499, 508, 510, 123/511
See application file for complete search history.

(56) References Cited

U.S. PATENT DOCUMENTS

| | | | |
|---|---|---|---|
| 6,823,834 B2 * | 11/2004 | Benson et al. | 123/299 |
| 7,392,792 B2 * | 7/2008 | Puckett | 123/456 |
| 2002/0157646 A1 * | 10/2002 | Hiraku et al. | 123/456 |
| 2005/0103312 A1 | 5/2005 | Uchiyama | |
| 2008/0035119 A1 * | 2/2008 | Marriott et al. | 123/494 |

FOREIGN PATENT DOCUMENTS

| | | |
|---|---|---|
| EP | 0 860 601 A2 | 8/1998 |
| EP | 860600 A2 * | 8/1998 |

(Continued)

OTHER PUBLICATIONS

European Search Report mailed Sep. 17, 2008.

*Primary Examiner*—Stephen K Cronin
*Assistant Examiner*—Anthony L Bacon
(74) *Attorney, Agent, or Firm*—Crowell & Moring LLP

(57) ABSTRACT

The present invention reduces exhaust emissions at startup, provides improved fuel pressure control performance in a low-load region, and detects high-pressure fuel system abnormalities. Disclosed is a high-pressure fuel system control device which includes a high-pressure pump for pressurizing fuel and discharging the pressurized fuel to a fuel rail, an injector for injecting the fuel stored in the fuel rail, and a fuel pressure sensor for measuring the pressure of the fuel stored in the fuel rail, and controls the high-pressure pump and the injector in accordance with an output generated from the fuel pressure sensor. The high-pressure fuel system control device includes a homo-elasticity coefficient estimation section for estimating a homo-elasticity coefficient of fuel in accordance with a pressure change which occurs when a fuel discharge amount of the high-pressure pump is not smaller than a predetermined value; a fuel pressure estimation section for estimating fuel pressure within the fuel rail in accordance with the homo-elasticity coefficient and control target values for the high-pressure pump and the injector; and a fuel control section for correcting an injection pulse of the injector in accordance with the fuel pressure estimated by the fuel pressure estimation section.

14 Claims, 18 Drawing Sheets

FOREIGN PATENT DOCUMENTS

| | | |
|---|---|---|
| EP | 1 022 452 A2 | 7/2000 |
| EP | 1030047 A2 * | 8/2000 |
| JP | 2000-234543 A | 8/2000 |
| JP | 3587011 B2 | 8/2004 |
| WO | WO 01/83969 A2 | 11/2001 |
| WO | WO 2005/031139 A1 | 4/2005 |

* cited by examiner

CONTROL DEVICE FOR HIGH-PRESSURE FUEL SYSTEM

BACKGROUND OF THE INVENTION

1. Field of the Invention

The present invention relates to a control device for a high-pressure fuel system in a direct-injection internal combustion engine.

2. Description of the Related Art

The direct-injection internal combustion engine includes a fuel control section that measures fuel pressure in a fuel rail and calculates injector valve opening time (injection pulse width) in accordance with the measured fuel pressure for the purpose of enabling an injector to inject a target amount of fuel. One of the problems with the direct-injection internal combustion engine is fuel pressure pulsation in the fuel rail. Fuel pressure pulsation occurs because fuel discharge from a high-pressure pump and fuel injection from the injector are intermittent. This fuel pressure pulsation may cause the injector's fuel injection amount to deviate from a target controlled variable, thereby incurring exhaust deterioration.

The other problems with the direct-injection internal combustion engine are, for instance, fuel leakage from a high-pressure system and defects in the injector and high-pressure pump. Fuel leakage and defects may reduce fuel control accuracy, thereby causing exhaust deterioration. Therefore, methods for estimating the fuel pressure from controlled variables of the injector and high-pressure pump are proposed as conventional technologies for solving the above problems. For example, a technology disclosed in JP-A-2000-234543 varies a control gain to cope with fuel pressure pulsation, whereas a technology disclosed in Japanese Patent No. 3587011 estimates the fuel pressure and compares it with the measured fuel pressure to detect a defect.

SUMMARY OF THE INVENTION

However, the above conventional technologies may cause exhaust deterioration and incorrect diagnosis when fuel properties change or different types of fuel (e.g., ethanol and gasoline) are mixed. The reason is that the above conventional technologies estimate the fuel pressure from only the elasticity coefficient of a specific fuel (e.g., gasoline). The use of fuels having different elasticity coefficients increases fuel pressure estimation error. Further, if, for instance, discharge dispersion, injection dispersion, and leakage are not considered in a situation where only the elasticity coefficient is estimated, fuel pressure estimation error increases in a startup region or low-load region. Therefore, the above conventional technologies suffer from the problem that they cannot be applied to fuel control and diagnosis of such regions.

The present invention has been made in view of the above circumstances. An object of the present invention is to provide a high-pressure fuel system control device that prevents exhaust deterioration, which may result from fuel pulsation or fuel system malfunction.

According to one aspect of the present invention, there is provided a control device including a fuel injection control section for controlling an injector, which injects fuel stored in a fuel rail that stores fuel pressure-fed from a high-pressure pump, wherein the fuel injection control section includes a homo-elasticity coefficient calculation section for calculating a homo-elasticity coefficient in accordance with a pressure change in the fuel rail, which is brought about by fuel discharge from the high-pressure pump, a fuel pressure estimation section for estimating pressure within the fuel rail in accordance with the homo-elasticity coefficient and controlled variables of the high-pressure pump and injector, and a fuel control section for calculating an injector pulse width in accordance with the pressure estimated by the fuel pressure estimation section and outputting an injector drive pulse to the injector in accordance with the calculated injector pulse width. The use of the configuration described above makes it possible to provide increased fuel pressure estimation accuracy and exercise accurate fuel control.

Further, if the homo-elasticity coefficient is estimated when a fuel discharge amount of the high-pressure pump is not smaller than a predetermined value, fuel pressure estimation accuracy increases.

Furthermore, the predetermined value is close to a maximum discharge amount of the high-pressure pump. The reason is that the use of such a predetermined value reduces discharge dispersion of the high-pressure pump.

Alternatively, the homo-elasticity coefficient calculation section estimates the homo-elasticity coefficient when a cam for driving the high-pressure pump is rotating at a speed not higher than a predetermined speed. The reason is that homo-elasticity coefficient calculation error will be reduced due to gradual fuel pressure changes.

Further, the homo-elasticity coefficient calculation means includes a leak amount calculation section for calculating the amount of fuel leakage from the high-pressure pump by using at least one of the angle of a cam for driving the high-pressure pump, the crank angle of an engine that coordinates with the cam, fuel temperature, engine water temperature, and the fuel pressure within the fuel rail.

Furthermore, an in-cylinder pressure estimation section is included to estimate the engine's in-cylinder pressure prevailing during fuel injection from at least one of an intake air amount, an engine speed, and fuel injection timing. Moreover, a fuel control section is included to correct an injection pulse of the injector in accordance with the in-cylinder pressure. The use of the configuration described above increases homo-elasticity coefficient estimation accuracy and particularly improves fuel control performance for startup.

According to another aspect of the present invention, there is provided a high-pressure fuel system control device that includes a high-pressure pump for pressurizing fuel and discharging the pressurized fuel to a fuel rail, an injector for injecting the fuel stored in the fuel rail, and a fuel pressure sensor for measuring the pressure of the fuel stored in the fuel rail, and controls the high-pressure pump and the injector in accordance with an output generated from the fuel pressure sensor, the high-pressure fuel system control device including: a homo-elasticity coefficient estimation section for estimating a homo-elasticity coefficient of fuel in accordance with a pressure change that occurs when a fuel discharge amount of the high-pressure pump is not smaller than a predetermined value; a fuel pressure estimation section for estimating fuel pressure within the fuel rail in accordance with the homo-elasticity coefficient and control target values for the high-pressure pump and the injector; a correction amount computation section which computes a correction amount for correcting an internal variable (fuel amount) of the fuel pressure estimation section in accordance with the fuel pressure estimated by the fuel pressure estimation section and the pressure measured by the fuel pressure sensor; and a fuel control section for controlling the high-pressure pump and the injector in accordance with the fuel pressure estimated by the fuel pressure estimation section. The use of the configuration described above provides robust control over discharge dispersion of the high-pressure pump and injection dispersion of the injector and particularly improves fuel control performance in a low-load region.

In addition, a homo-elasticity coefficient correction section is included. When an integrated value of the correction amount ($\Sigma$ correction amount) is outside a predetermined range, the homo-elasticity coefficient correction section corrects the homo-elasticity coefficient to decrease the $\Sigma$ correction amount. Alternatively, a homo-elasticity coefficient estimation section is included. When the $\Sigma$ correction amount is outside the predetermined range, the homo-elasticity coefficient estimation section reestimates the homo-elasticity coefficient during idling. The use of the configuration described above maintains expected fuel control performance even when the homo-elasticity coefficient changes during operation.

Further, an malfunction judgment section is included. When the homo-elasticity coefficient is outside a predetermined range, the malfunction judgment section judges that the high-pressure fuel system is abnormal. Alternatively, when the $\Sigma$ correction amount is outside the predetermined range after the homo-elasticity coefficient is corrected by the homo-elasticity coefficient correction section, the malfunction judgment section may judge that the high-pressure fuel system is abnormal. The use of the configuration described above makes it possible to make a diagnosis in accordance with the homo-elasticity coefficient and correction amount even at startup or in a low-load region.

Furthermore, a target fuel amount is set to determine the injector pulse width in accordance with the homo-elasticity coefficient. The use of this configuration makes it possible to detect the introduction of fuels (e.g., light oil and ethanol) having different homo-elasticity coefficients. Consequently, fuel injection can be performed in consideration of the calorific value and volatility of each fuel to avoid exhaust deterioration at startup.

The present invention can reduce exhaust emissions at startup because it begins to accurately control the fuel injection amount immediately after startup. Further, the present invention provides improved fuel pressure control performance in a low-load region because it is robust for fuel injection and discharge dispersion. Furthermore, the present invention can immediately detect high-pressure fuel system abnormalities, thereby making it possible to prevent abnormalities from developing and avoid exhaust deterioration due to abnormalities.

DETAILED DESCRIPTION OF THE PREFERRED EMBODIMENTS

Embodiments of the present invention will now be described with reference to the accompanying drawings.

Figure 1:
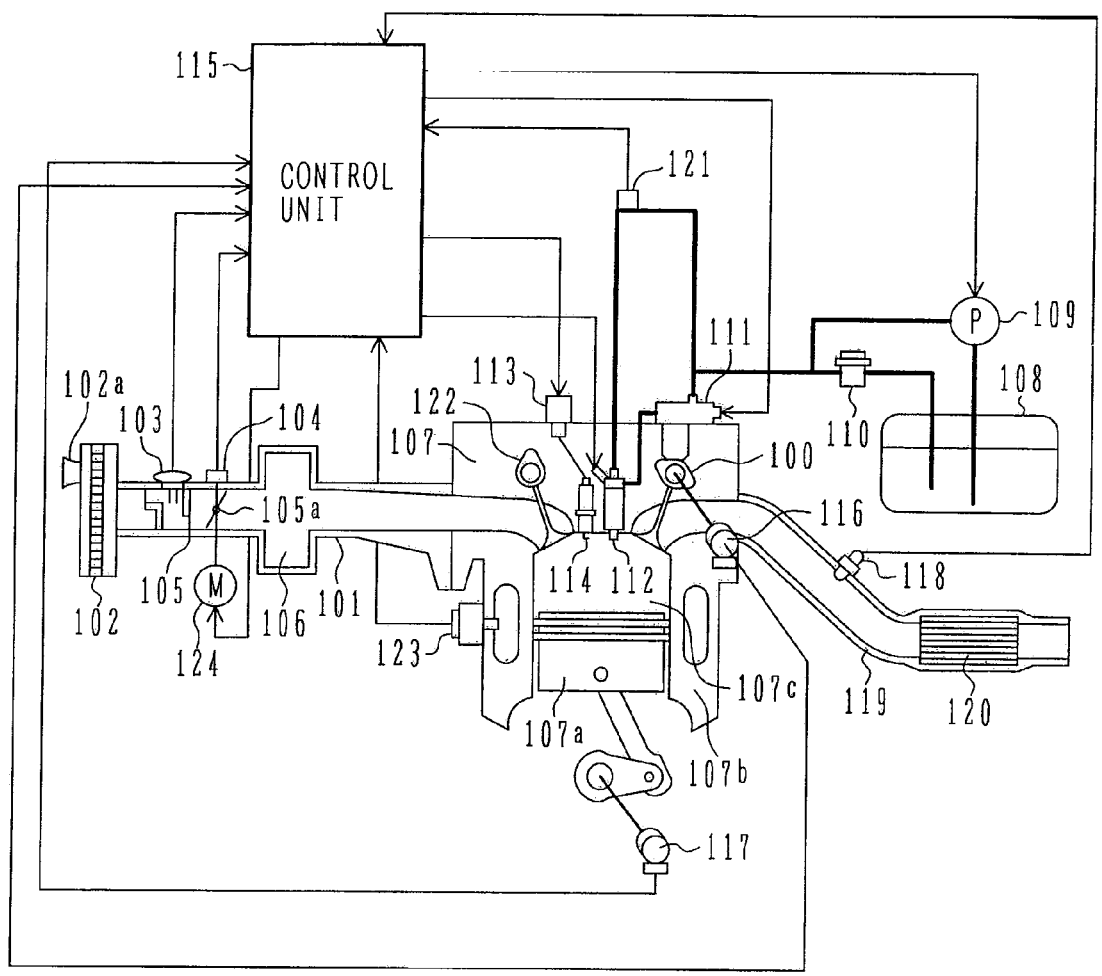
FIG. 1 is a diagram illustrating the overall configuration of a direct-injection internal combustion engine.

FIG. 1 is a typical diagram illustrating the overall configuration of a direct-injection internal combustion engine according to the present invention. Intake air, which is introduced to a cylinder 107b, is taken in from an inlet 102a of an air cleaner 102. The intake air then passes through an air flow meter (air flow sensor 103), which is one of operating state measurement sections of the internal combustion engine, and enters a collector 106 through a throttle body 105 in which an electronically-controlled throttle valve 105a is housed to control an intake air flow rate. The air flow sensor 103 outputs a signal that indicates the intake air flow rate. This signal is delivered to a control unit 115, which serves as an internal combustion engine control device. The throttle body 105 includes a throttle sensor 104, which detects the opening of the electronically-controlled throttle valve 105a as one of the operating state measurement sections of the internal combustion engine. A signal output from the throttle sensor 104 is also delivered to the control unit 115. The air taken into the collector 106 is distributed to intake pipes 101, which are connected to cylinders 107b of the internal combustion engine 107, and then introduced into a combustion chamber 107c of each cylinder 107b.

Meanwhile, gasoline or other fuel is, from a fuel tank 108, subjected to primary pressurization by a fuel pump 109, adjusted for a predetermined pressure by a fuel pressure regulator 110, subjected to secondary pressurization by a high-pressure fuel pump 111, and pressure-fed to a fuel rail. The resulting high-pressure fuel is injected into the combustion chamber 107c from an injector 112, which is provided for each cylinder 107. The fuel injected into the combustion chamber 107c is ignited by an ignition plug 114 through the use of an ignition signal whose voltage is raised by an ignition coil 113. A cam angle sensor 116, which is mounted on an exhaust valve camshaft and the exhaust valve camshaft drives a cam 100, outputs a signal for detecting the phase of the camshaft. This signal is delivered to the control unit 115. The cam angle sensor may alternatively be mounted on an intake valve camshaft which drives a cam 122. A crank angle sensor 117 is mounted on a crankshaft to detect the rotation and phase of the crankshaft of the internal combustion engine. The crankshaft connects with a piston 107a. An output generated from the crank angle sensor 117 enters the control unit 115. An air-fuel ratio sensor 118, which is installed upstream of a catalyst 120 in an exhaust pipe 119, detects oxygen in an exhaust gas and outputs the resulting detection signal to the control unit 115. An output signal of a water temperature sensor 123 inputs to the control unit 115.

Figure 2:
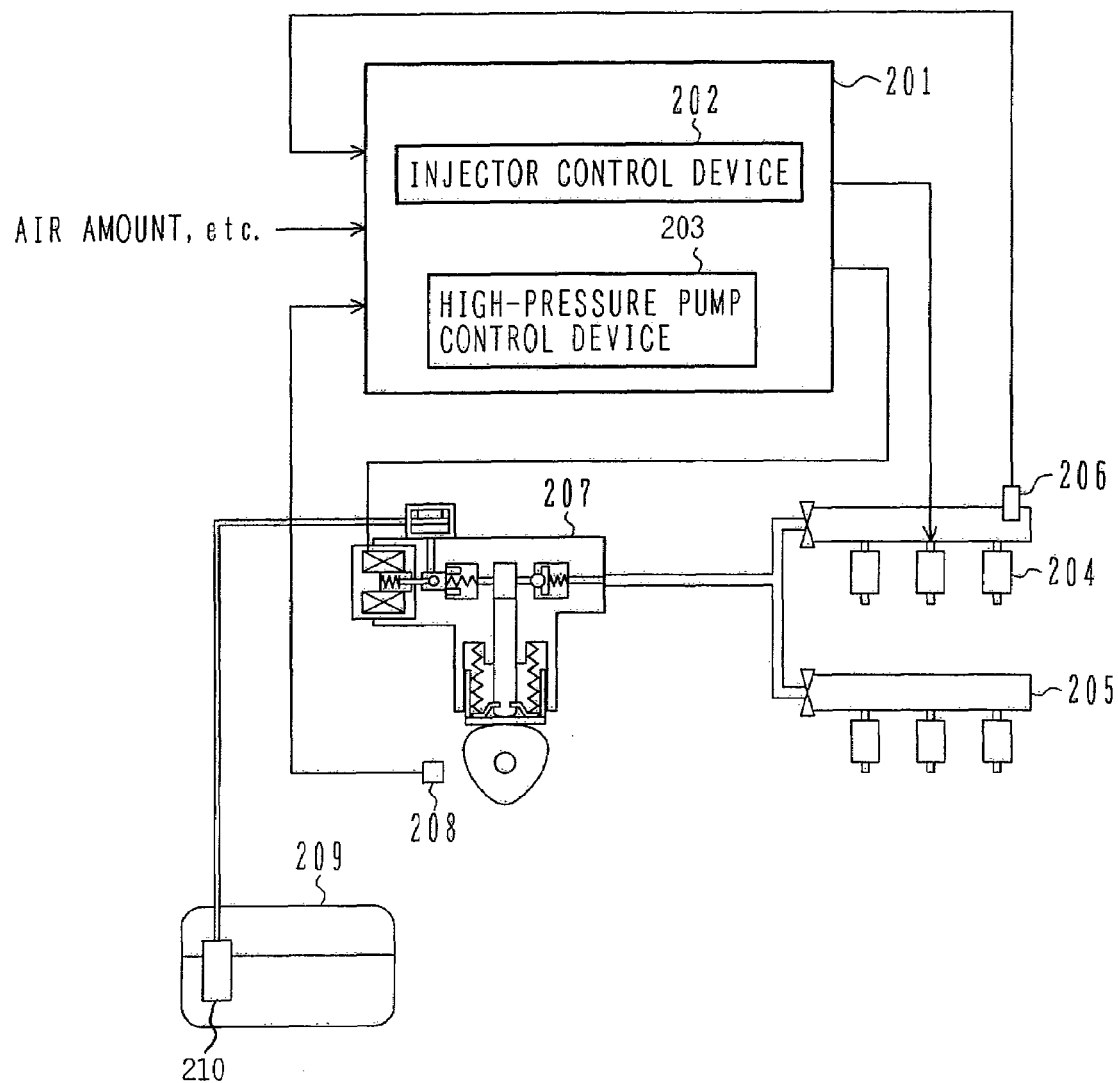
FIG. 2 is a diagram illustrating the configuration of a fuel control system.

FIG. 2 is a schematic diagram illustrating the configuration of a fuel control system. A controller 201 includes an injector control device 202 and a high-pressure pump control device 203. The injector control device 202 injects a target amount of fuel into the cylinder by controlling the injector 204 in accordance, for instance, with the air amount, air-fuel ratio, and engine speed. The high-pressure pump control device 203 raises the pressure of the fuel, which is taken in from the fuel tank 209 by the fuel pump 210, to a target pressure by controlling the high-pressure pump 207 in accordance with an output generated from a fuel pressure sensor 206, which is mounted on the fuel rail 205, and an output generated from a cam angle sensor 208 for a cam that drives the high-pressure pump 207.

Figure 3:
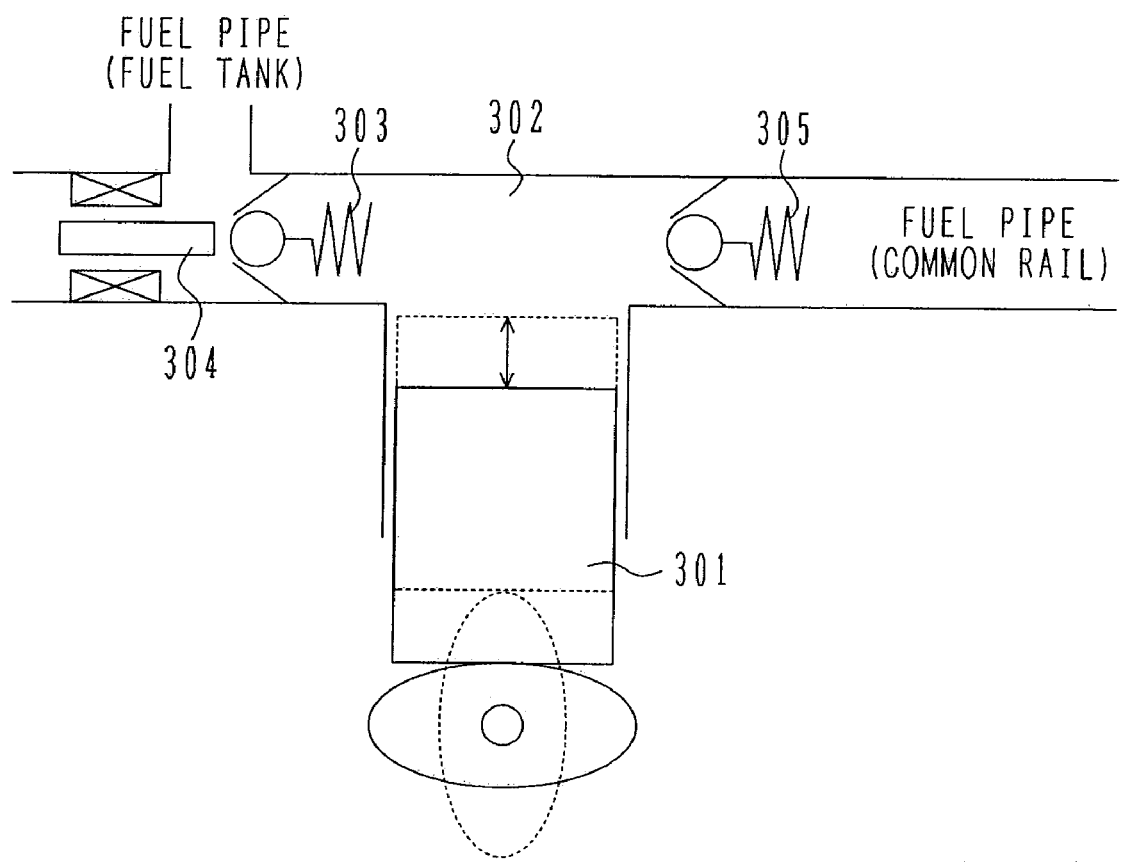
FIG. 3 shows an example of a high-pressure pump.

FIG. 3 shows an example of the high-pressure pump. In this example, the fuel supplied through a tank fuel pipe when a plunger 301 moves up and down is taken into a pump chamber 302 and discharged into a fuel rail fuel pipe. In the fuel rail fuel pipe, a check valve 305 is provided. The discharge amount of the high-pressure pump is adjusted by allowing a solenoid valve 304 to push open an intake check valve 303 during a plunger ascent and letting the fuel flow back toward the fuel tank. Therefore, the fuel is intermittently discharged in synchronism with an engine's cam angle.

Figure 4:
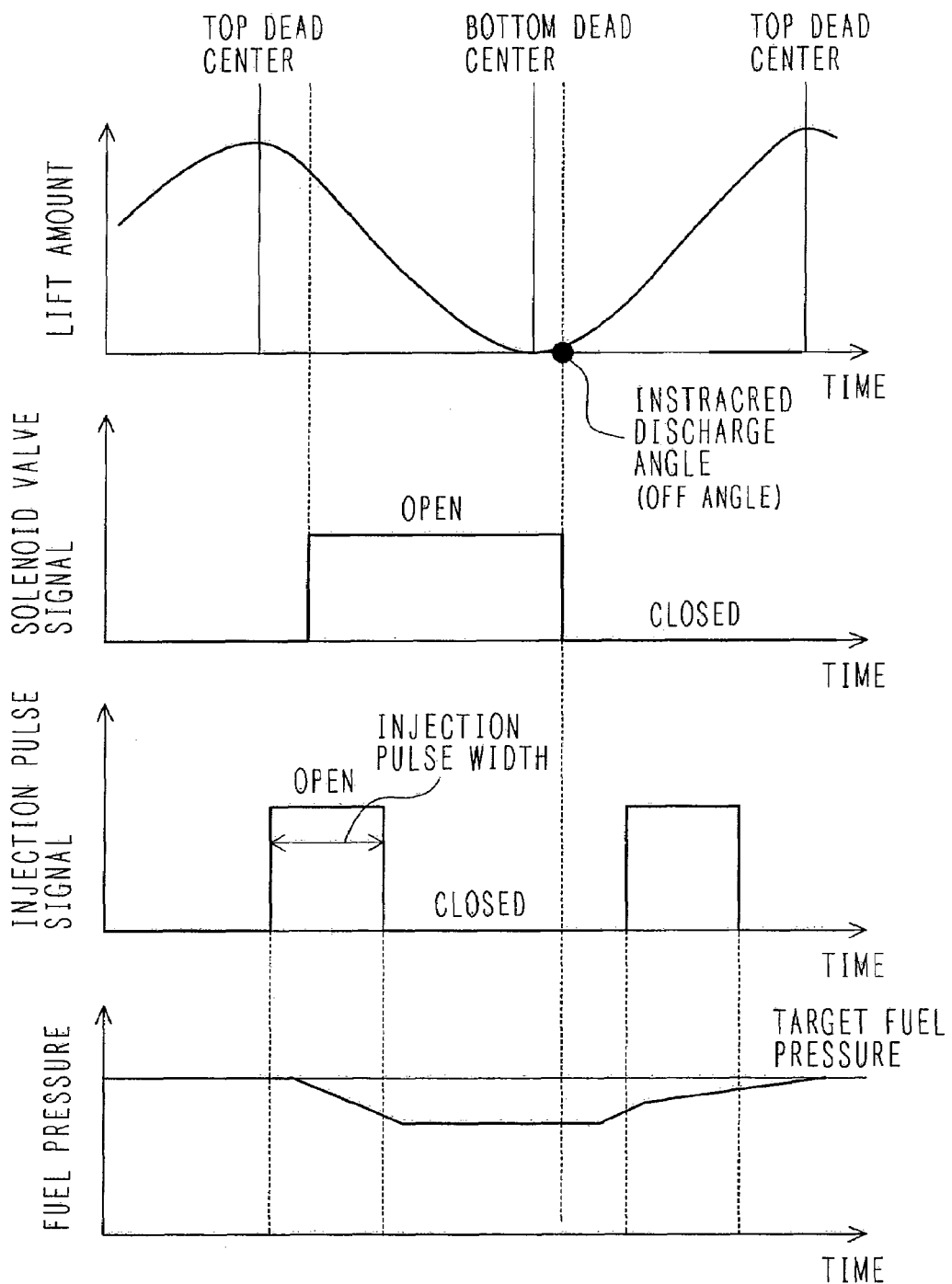
FIG. 4 shows a set of timing diagrams that illustrate how the fuel control system operates.

FIG. 4 shows a set of timing diagrams that schematically illustrate the relationship between a plunger lift amount, a high-pressure pump drive signal (solenoid valve signal), an injector drive signal (injection pulse signal), and the fuel pressure measured in the fuel rail. The high-pressure pump takes in fuel while the plunger moves from the top dead center to the bottom dead center, and discharges fuel while the plunger moves from the bottom dead center to the top dead center. The fuel discharge amount is mainly determined by timing with which the solenoid valve closes (OFF angle). The discharge amount decreases as the OFF angle of the solenoid valve retards from the bottom dead center. Meanwhile, the injector opens an injection valve in accordance with the injection pulse signal. While the same fuel pressure is maintained, the injection amount increases with an increase in the time during which the injection pulse signal is open. In this instance, fuel pressure pulsation occurs so that the fuel pressure measured in the fuel rail increases when the high-pressure pump discharges fuel and decreases when the injector injects fuel.

Figure 5:
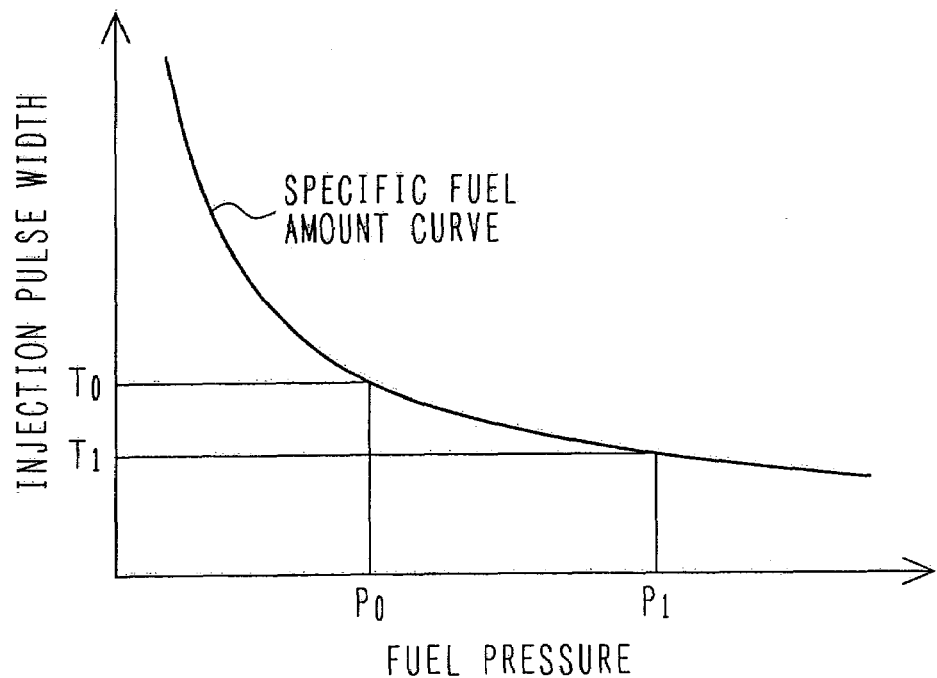
FIG. 5 illustrates the relationship between pulse width and fuel pressure that are required for injecting a specific amount of fuel.

FIG. 5 illustrates the relationship between the pulse width and fuel pressure that are required for injecting a target amount of fuel. It is generally known that the relationship between a pressure $P_1$ and pulse width $T_1$ providing a specific fuel amount when a predetermined injection pulse width $T_0$ is used at a predetermined pressure $P_0$ is expressed by the equation $T_1 = T_0 * \text{sqrt}(P_0/P_1)$. Thus, this relationship is usually used to correct the fuel pulse width in accordance with fuel pressure and obtain fuel injection amount robustness for fuel pressure. However, this causes the following technical problem.

Figure 6:
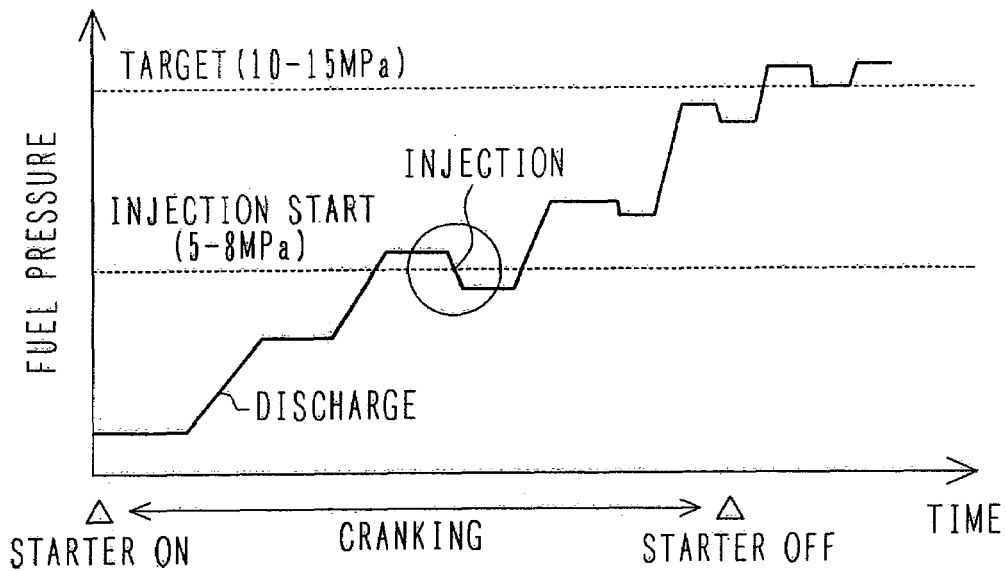
FIG. 6 is a typical timing diagram illustrating a fuel pressure that prevails at startup.

FIG. 6 is a timing diagram illustrating a fuel pressure that prevails at startup. When cranking occurs to rotate a pump cam and let the pump to discharge fuel until a predetermined injection start pressure (5 to 8 MPa) is reached due to a discharge-induced pressure rise, the injector injects fuel. When the fuel explodes to let the engine autonomously rotate, the pump discharge amount is controlled so as to obtain a predetermined target pressure (10 to 15 MPa). The technical problem is an injection error due to a fuel pressure drop that is caused by fuel injection by the injector. The injection error can be corrected by estimating the fuel pressure drop. However, the conventional technologies use the elasticity coefficient of a particular fuel for fuel pressure estimation. Therefore, changes in the fuel properties and the mixture of different types of fuel may increase the amount of unburned fuel or incur a combustion failure, thereby causing exhaust deterioration. As such being the case, a method for compensating for the injection error arising from pressure changes caused by a discharge operation of the pump will be disclosed below.

The present invention estimates a homo-elasticity coefficient from a pressure change that occurs in the fuel rail due to a discharge operation of the pump, and exercises control and makes a diagnosis in accordance with the homo-elasticity coefficient. A control device according to an embodiment of the present invention will be summarized below.

Figure 8:
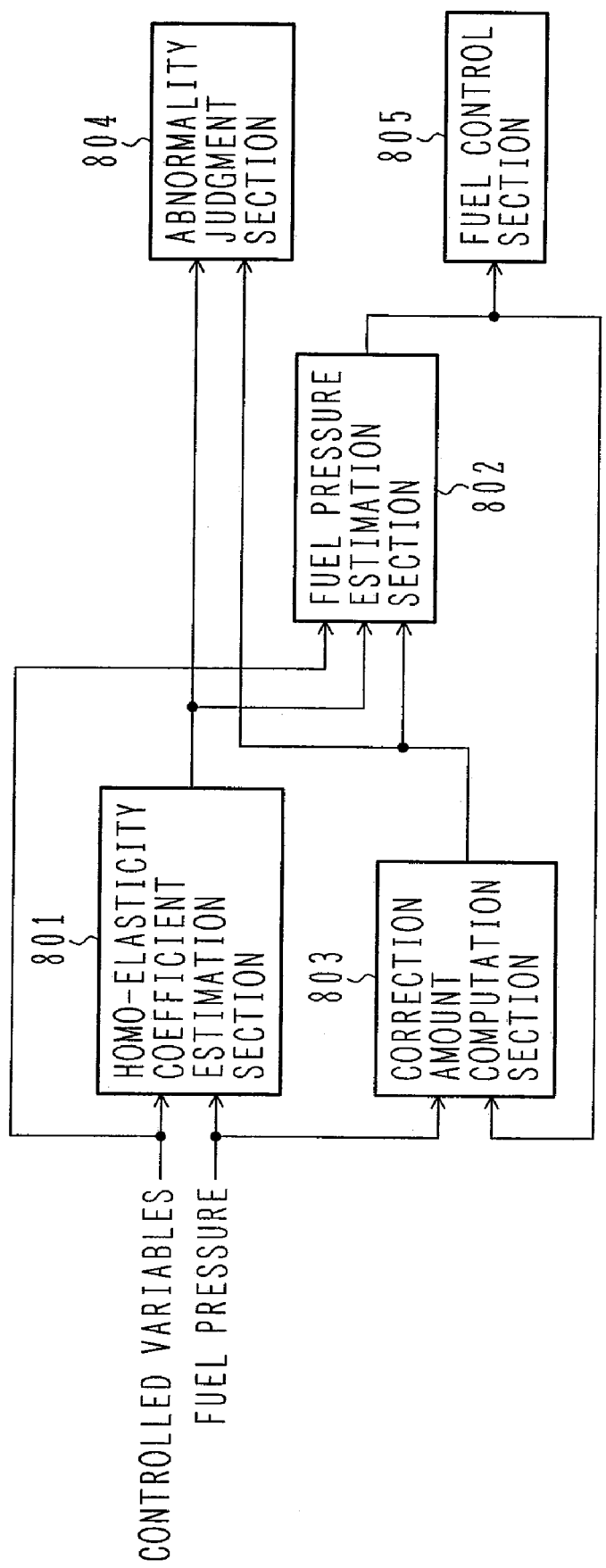
FIG. 8 is an overall block diagram illustrating an embodiment of the present invention.

FIG. 8 is an overall block diagram illustrating an example of the control device.

A homo-elasticity coefficient estimation section 801 estimates the homo-elasticity coefficient of the fuel in accordance with the controlled variables of the high-pressure pump and injector and the fuel pressure measured by the sensor. The homo-elasticity coefficient is an elasticity coefficient that takes the movement of fuel into account, and is defined by a pressure change in the fuel rail. For example, the homo-elasticity coefficient K is calculated from the equation $K = V * dP/X_i$, where V is a fuel rail volume, dP is the difference between the fuel pressure measured before a discharge and the fuel pressure measured after a discharge, and $X_i$ is a pump discharge amount.

A fuel pressure estimation section 802 uses, for instance, the equation $Pe = K/V(\Sigma(X_i - X_o) + X_c)$ to estimate the fuel rail fuel pressure in accordance with the controlled variables of the high-pressure pump and injector, homo-elasticity coefficient, and correction amount (described later). Pe is an estimated fuel pressure, K is a homo-elasticity coefficient, V is a fuel rail volume, $X_i$ is a pump discharge amount, $X_o$ is an injector injection amount, and $X_c$ is a correction amount.

A correction amount computation section 803 computes the correction amount in accordance with the estimated fuel pressure and the fuel pressure measured by the sensor. It is assumed that the correction amount is computed by using, for instance, the equation $X_c = (Pe - P) * C$, where $X_c$ is the correction amount, Pe is the estimated pressure, P is the measured fuel pressure, C is a predetermined coefficient that is calculated in accordance with the operating state and called an observer gain. The observer gain is determined, for instance, by a pole assignment method or an optimal regulator method. The use of the correction amount computation section 803 makes it possible to estimate a preferred fuel pressure. Further, $X_c$ may be regarded as equal to $\Sigma(Pe - P) * C$ and updated as needed.

An malfunction judgment section 804 judges in accordance with the homo-elasticity coefficient and correction amount whether the high-pressure fuel system is abnormal. A fuel control section 805 controls the pump discharge amount and injector injection amount in accordance with the estimated fuel pressure.

Further, another problem, which is described below, can be solved.

Figure 7A:
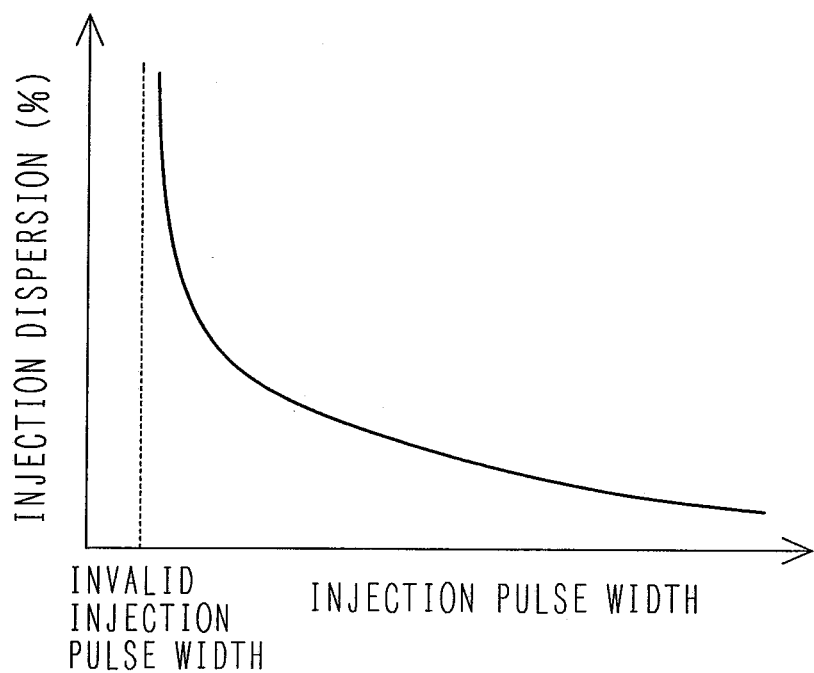
FIGS. 7A and 7B illustrate injector injection dispersion and pump discharge dispersion.
Figure 7B:
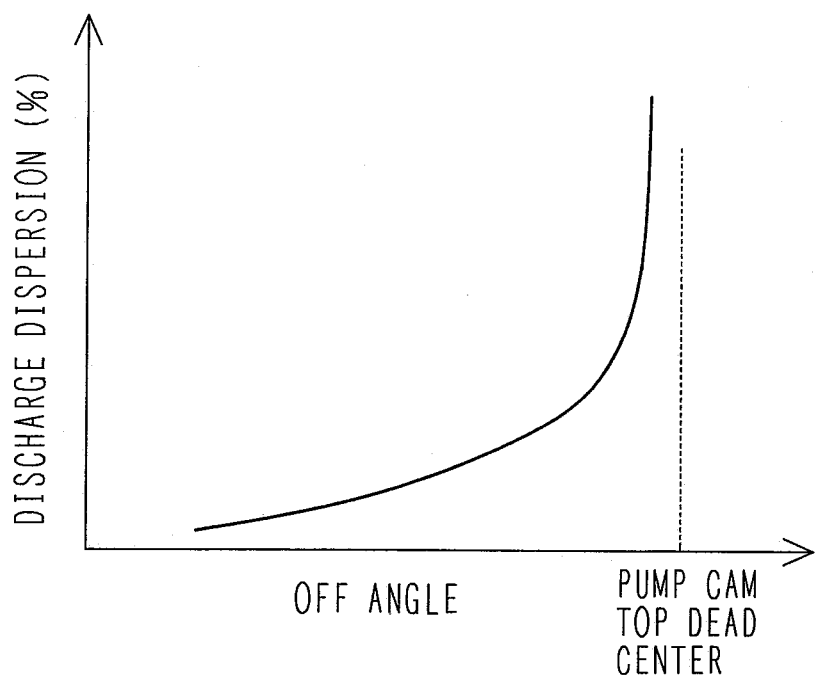

FIGS. 7A and 7B illustrate injector injection dispersion and pump discharge dispersion. If control is exercised so that the pulse width is close to an invalid injection pulse width, which disables a fuel injection function, or that an instructed pump discharge angle is close to a pump cam top dead center, an increased fuel pressure estimation error may occur. Thus, an erroneous judgment might be formed to conclude that the high-pressure fuel system is abnormal.

The above problem occurs because the elasticity coefficient of a predetermined fuel is calculated or estimated to calculate the fuel pressure.

Therefore, if the homo-elasticity coefficient is calculated when the injection pulse width is somewhat greater than the invalid injection pulse width or when the pump discharge amount is rather large, it is possible to reduce the error resulting from injection dispersion and discharge dispersion.

First Embodiment

A case where an embodiment of the present invention is applied to startup fuel control will now be described with reference to FIGS. 9, 10A, and 10B.

Figure 9:
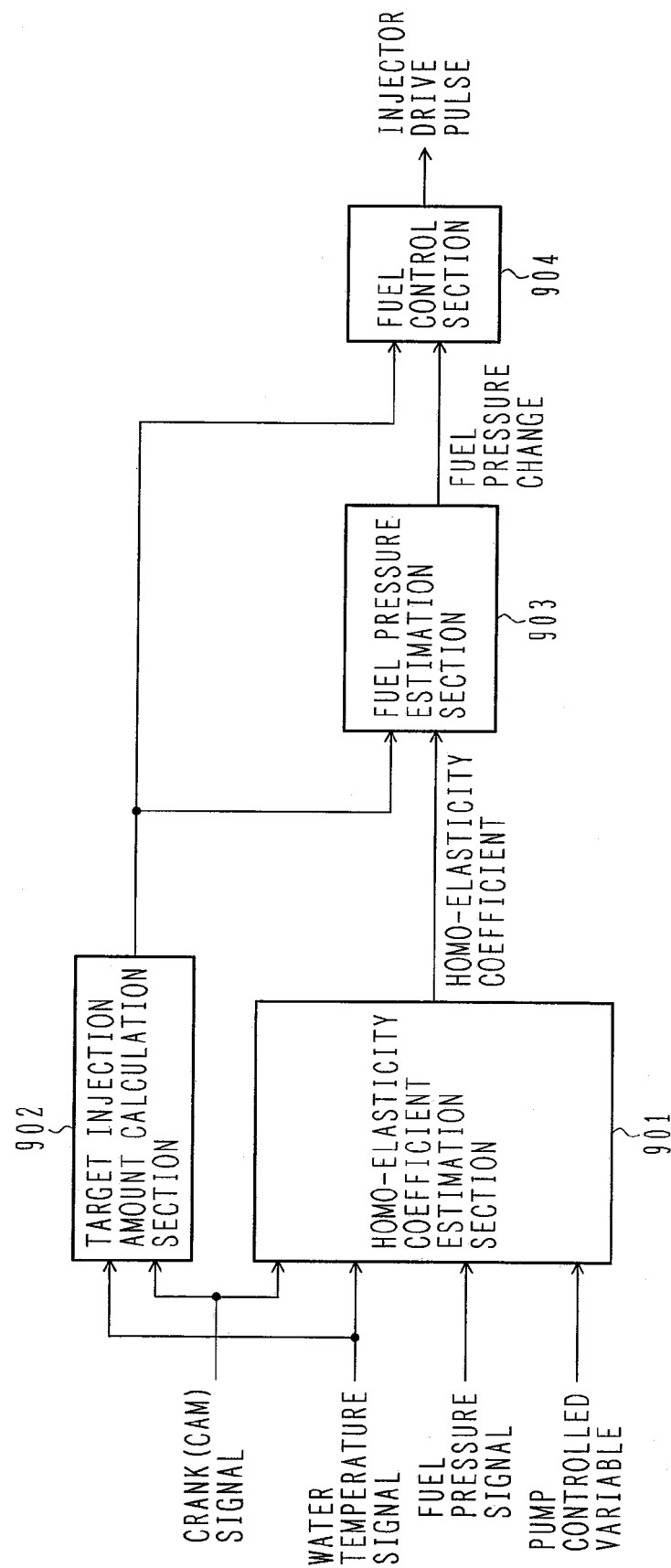
FIG. 9 shows an example of a fuel amount correction block for startup.

FIG. 9 shows an example of a fuel amount correction block for startup. A homo-elasticity coefficient estimation section 901 judges in accordance with the pump controlled variable and crank angle signal or cam angle signal whether the pump discharge amount is not smaller than a predetermined value (is close to a maximum discharge amount preferably), and estimates the homo-elasticity coefficient in accordance with the encountered fuel pressure change and the aforementioned definition. In this instance, the homo-elasticity coefficient may be corrected in accordance with a temperature change from the fuel temperature (or water temperature) prevailing at the time of homo-elasticity coefficient estimation to ensure that the homo-elasticity coefficient increases with an increase in the temperature. The reason is that the value dP increases with an increase in the fuel temperature. A target injection amount calculation section 902 calculates a fuel injection amount in accordance with the water temperature and crank signal. A target injection amount should preferably be calculated by calculating a fuel amount that withstands friction and provides a predetermined air-fuel ratio in relation to an air amount. The fuel amount may be calculated by using a map based on a water temperature signal and crank angle signal or by using any other means. Further, the fuel is preferably identified in accordance with the estimated homo-elasticity coefficient. Then, a target fuel amount is calculated in accordance with the identified fuel. A fuel pressure estimation section 903 estimates the fuel pressure within the fuel rail and a pressure change caused by fuel injection from the injector in accordance with the homo-elasticity coefficient and target injection amount. A fuel control section 904 controls an injector drive pulse width in accordance with the target injection amount and fuel pressure change. The injector drive pulse width can be calculated, for instance, from the equation Ti=D*Xo+Ti0, where Ti is a fuel injection pulse width, D is an injector coefficient to be calculated according to pressure, Xo is a target fuel injection amount, and Ti0 is an invalid injection pulse width to be calculated according to pressure. Further, when the injector coefficient is calculated by using the value Pe−dPe/2, which is obtained by subtracting half the pressure change dPe from the pressure Pe estimated before injection, while the invalid injection pulse width is calculated by using the pressure Pe estimated before injection, a target amount of fuel can be injected from the injector while compensating for the fuel pressure change. Since the equation dPe=K/V(Xi−Xo+Xc') is used for calculation, Xc'=(Pe−P)*C.

Figure 10A:
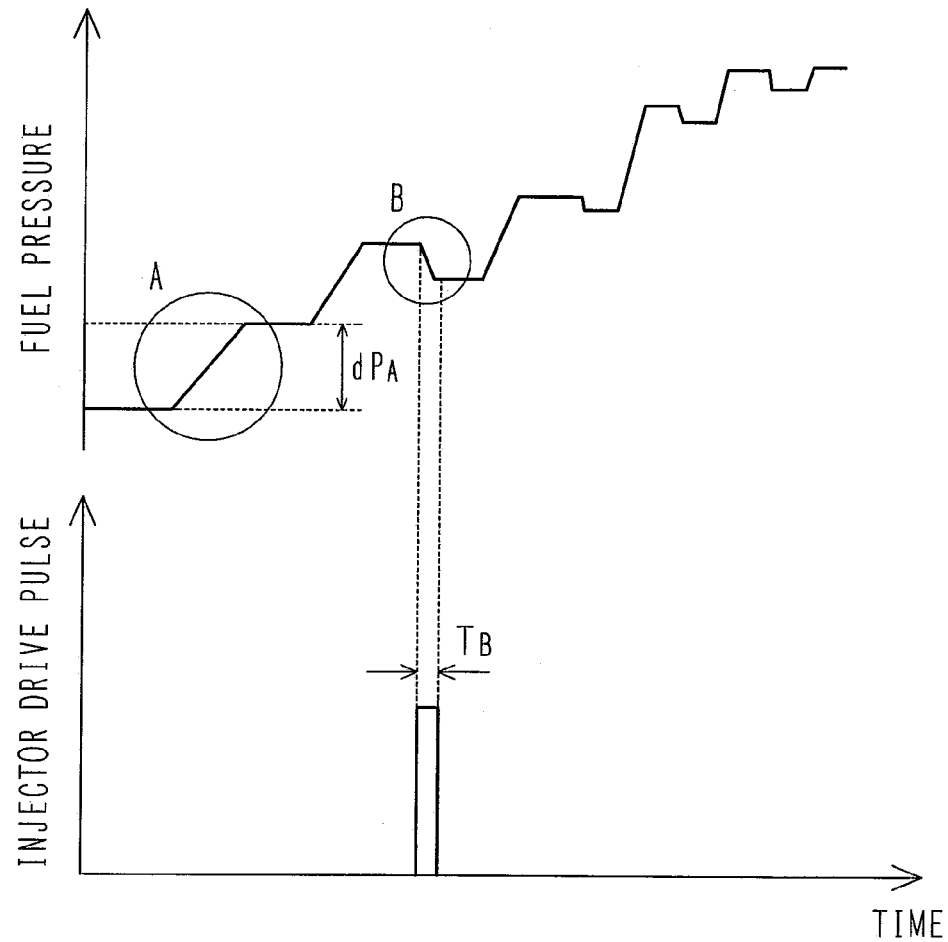
FIGS. 10A and 10B present a timing diagram illustrating an embodiment of the present invention in addition to pulse width correction results.
Figure 10B:
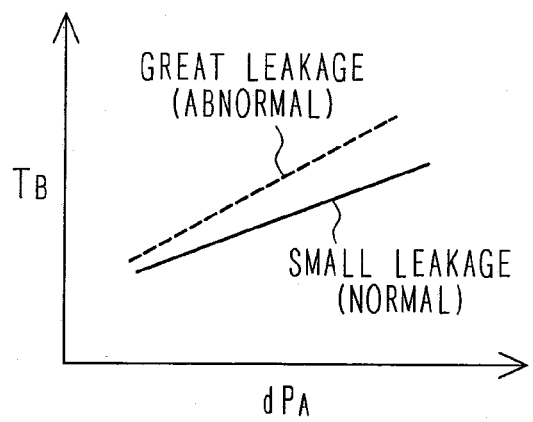

FIGS. 10A and 10B present a timing diagram illustrating an embodiment of the present invention in addition to pulse width correction results. The timing diagram in FIG. 10A shows fuel pressure changes at startup and the first injector drive pulse signal generated for startup. If the fuel pressure change encountered when the pump discharge is maximized is $dP_A$, the first injector pulse width is $T_B$, and the water temperature, engine speed, and injection start pressure virtually remain unchanged, the relationship shown in FIG. 10B is obtained. The reason is that an increase in the fuel pressure change dP increases the homo-elasticity coefficient and increases the fuel injection pulse width $T_B$ for correction purposes. Therefore, if leakage occurs, the estimated homo-elasticity coefficient becomes great. This results in the output of a pulse width greater than normal.

Second Embodiment

Control and diagnosis performed in consideration of leakage from the plunger will now be described with reference to FIGS. 11 to 13.

Figure 11A:
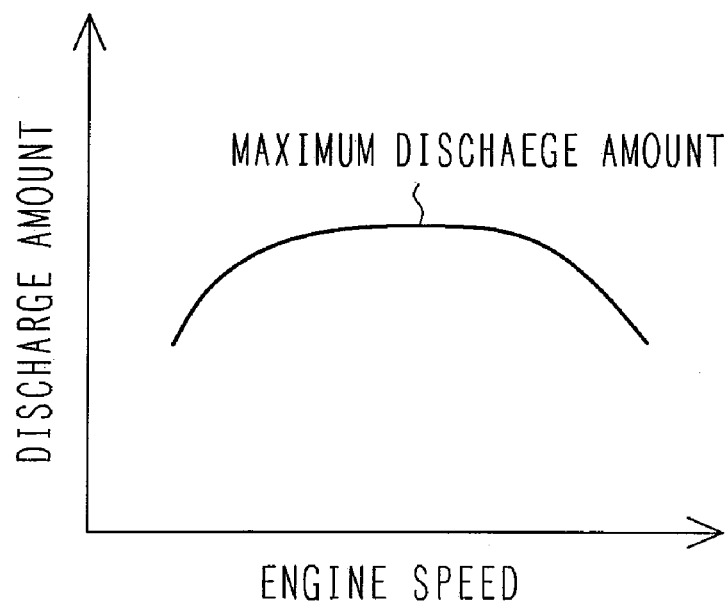
FIGS. 11A and 11B show a pump discharge characteristic and a cause of flow rate decrease.
Figure 11B:
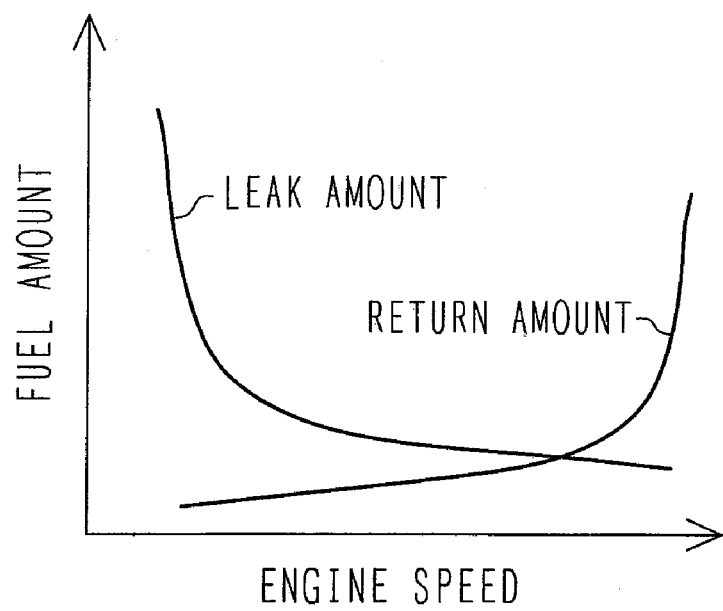

FIGS. 11A and 11B show a pump discharge characteristic and a cause of flow rate decrease. FIG. 11A shows a maximum discharge amount per discharge at various engine speeds. As shown in FIG. 11A, the discharge amount decreases in a low engine speed region and high engine speed region. The cause of such a discharge amount decrease is indicated in FIG. 11B. The flow rate decreases in the low engine speed region because the fuel leaks from a gap in the pump plunger when the engine speed is low. The flow rate of leakage depends on the viscosity of fuel and the pressure within the fuel pump chamber. More specifically, the leakage flow rate increases with a decrease in the viscosity and with an increase in the pressure. It is therefore preferred that the homo-elasticity coefficient be estimated in consideration of leak amount particularly during an engine cranking period and in a low engine speed region prevailing before complete explosion in the engine. It should be noted that the discharge amount decreases in the high engine speed region due to delayed discharge valve closure. The discharge amount decreases because the fuel flows backward (returns) from the fuel rail to the pump chamber before valve closure. The amount of this fuel return considerably varies although it increases with an increase in the fuel pressure within the fuel rail. Therefore, it is preferred that the homo-elasticity coefficient be estimated when the engine speed is not higher than a predetermined speed.

Figure 12:
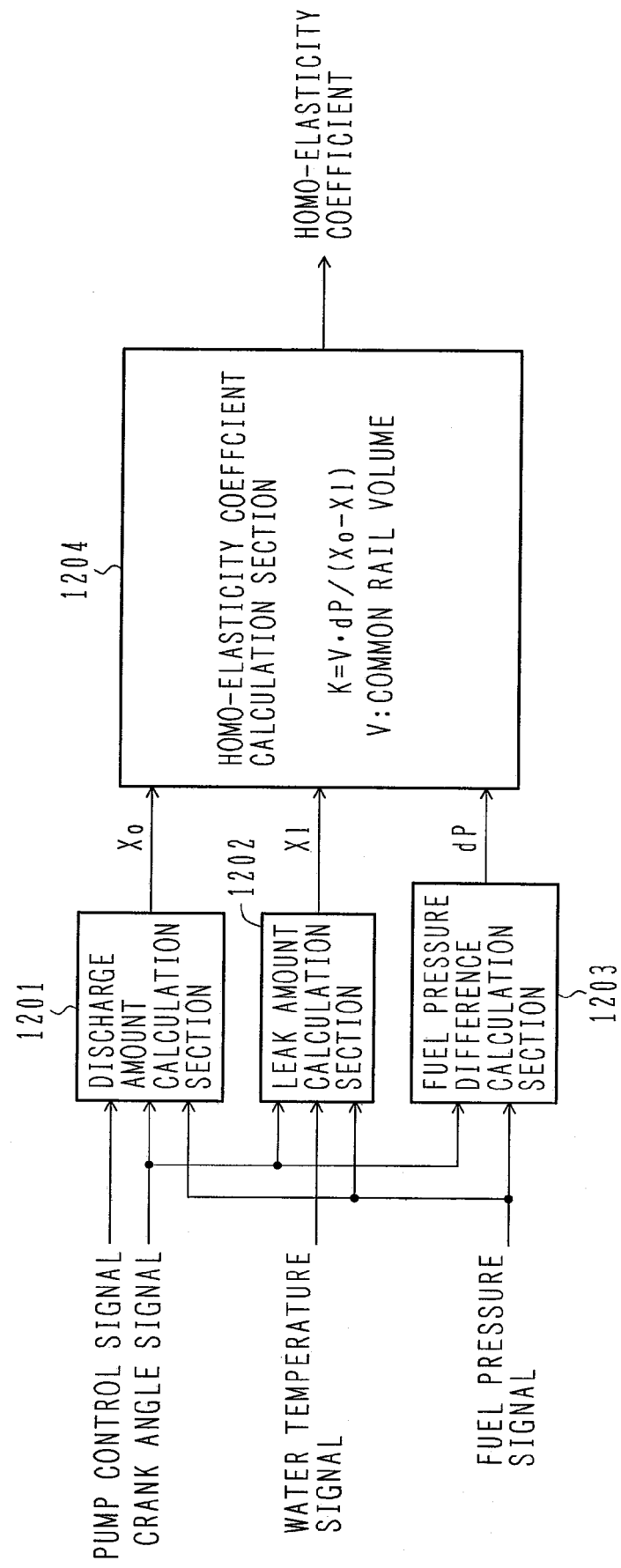
FIG. 12 is a typical block diagram illustrating a homo-elasticity coefficient setup section that is configured in consideration of leak amount.

FIG. 12 is a block diagram illustrating a typical method of estimating the homo-elasticity coefficient in consideration of leak amount. A discharge amount calculation section 1201 calculates a basic discharge amount Xo, which is determined by the operation of a pump discharge valve, in accordance with a pump controlled variable, crank angle signal, fuel pressure signal, and the like. A leak amount calculation section 1202 calculates a leak amount from the cam angle signal, crank angle signal, water temperature signal, fuel temperature signal, and fuel pressure signal. The leak amount can be calculated, for instance, by using the equation $X1=\Sigma(P-P_0)*J$, where X1 is the leak amount, P is a fuel pressure sensor value, $P_0$ is an atmospheric pressure, and J is a viscosity coefficient that varies with the fuel temperature. Engine water temperature may be used instead of the fuel temperature to estimate the fuel temperature. Σ provides integration while the fuel pressure is changed by a discharge operation. Furthermore, a fuel pressure difference calculation section 1203 calculates a pressure difference DP based on the difference between the fuel pressure measured before a discharge and the fuel pressure measured after a discharge. A homo-elasticity coefficient calculation section 1204 calculates the homo-elasticity coefficient from the discharge amount, leak amount, and pressure difference. The homo-elasticity coefficient can be calculated, for instance, by using the equation $K=V*DP/(Xi-X1)$, where K is a homo-elasticity coefficient, V is a fuel rail volume, DP is a pressure difference, Xi is a basic discharge amount, and X1 is a leak amount.

Figure 13:
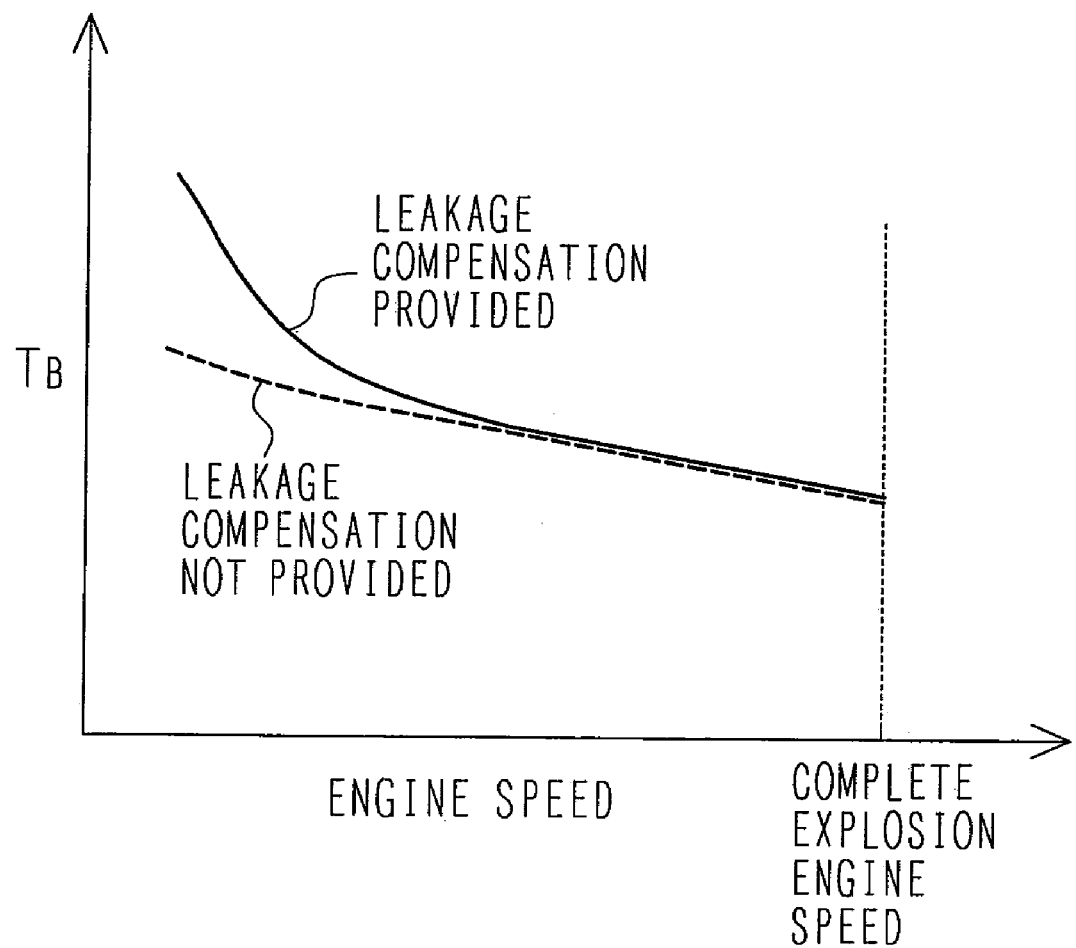
FIG. 13 illustrates the relationship between the first injection pulse width prevailing after startup and the engine speed prevailing during injection.

FIG. 13 illustrates the relationship between the first injection pulse width prevailing after startup and the engine speed prevailing during injection in a situation where leakage compensation is provided. Even if the pressure changes brought about by pump discharge operations are substantially equal, the homo-elasticity coefficient increases when the leak amount is considered. Therefore, the estimated pressure change is great. Thus, the fuel pulse Tb is greater than in a case where the present invention is not applied. Consequently, control and diagnosis can be performed with increased accuracy.

Third Embodiment

Control and diagnosis performed in consideration of in-cylinder pressure of the engine will now be described with reference to FIGS. 14 to 16.

Figure 14:
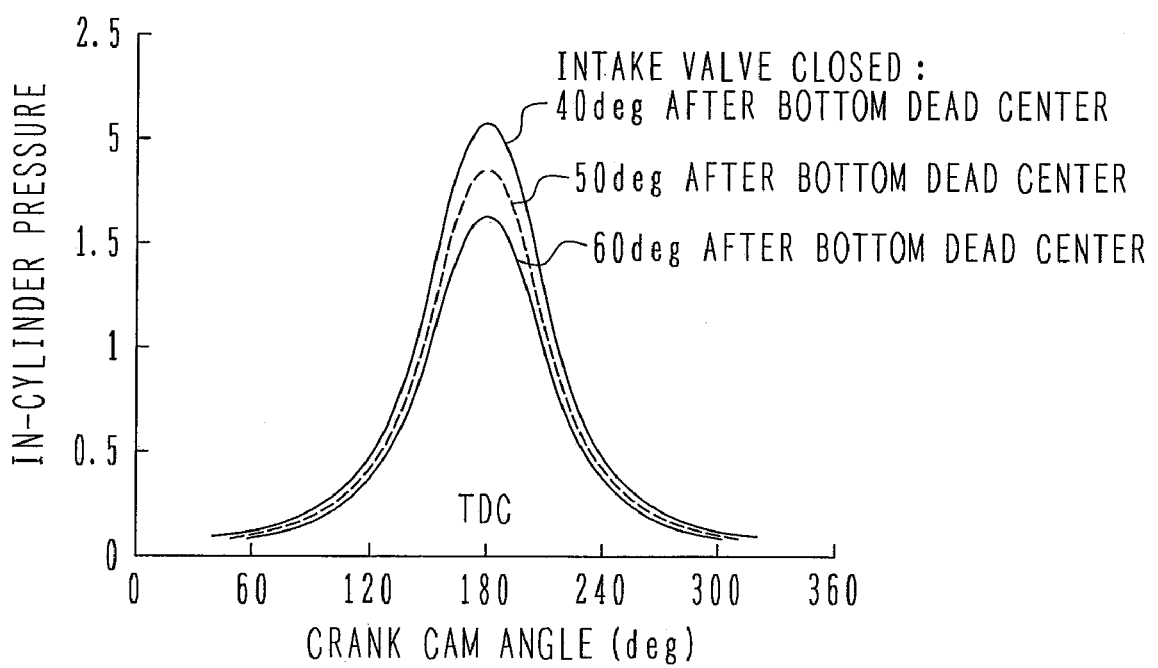
FIG. 14 shows typical in-cylinder pressure changes in the engine.

FIG. 14 shows in-cylinder pressure changes in the engine. Fuel injection occurs due to the difference between fuel pressure and in-cylinder pressure. The peak of in-cylinder pressure tends to lower when the timing of intake valve closure is retarded. However, when fuel is injected during a compression stroke at startup, control and diagnosis can be performed with increased accuracy by compensating for the in-cylinder pressure.

Figure 15:
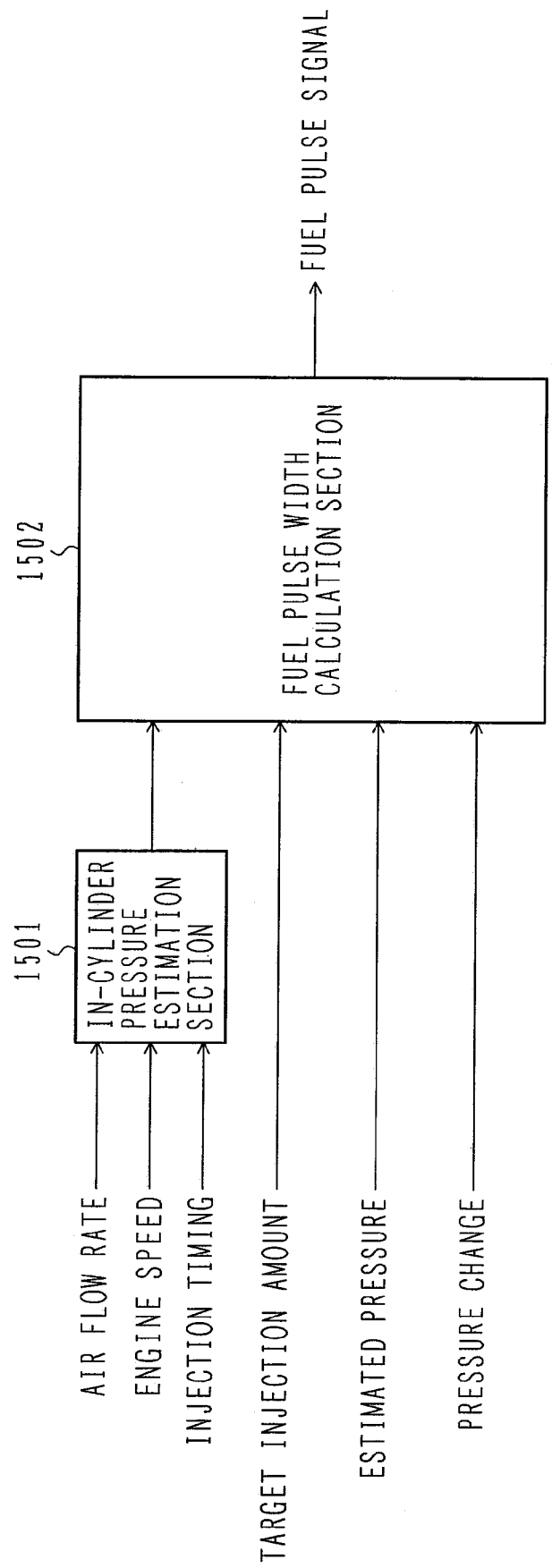
FIG. 15 is a typical block diagram illustrating a fuel control section that is configured in consideration of in-cylinder pressure.

FIG. 15 is a block diagram illustrating a fuel control section that is configured in consideration of in-cylinder pressure. An in-cylinder pressure estimation section 1501 estimates an in-cylinder pressure prevailing during fuel injection from an air flow rate, engine speed, and fuel injection timing. The in-cylinder pressure can be estimated, for instance, by preparing a map shown in FIG. 14 and decreasing a map reference value for correction purposes in accordance with the engine speed and air amount. A fuel pulse width calculation section 1502 then adds an in-cylinder pressure correction to a fuel pressure change correction. More specifically, when the fuel injection pulse width ($Ti=D*Xo+Ti0$) is to be calculated, it is assumed that the pressure used to calculate an injector coefficient D is equal to $Pe-Dpe+P0-Pc$, where Pe is an estimated fuel pressure, Dpe is a pressure change, P0 is an atmospheric pressure, and Pc is an in-cylinder pressure prevailing during fuel injection.

Figure 16:
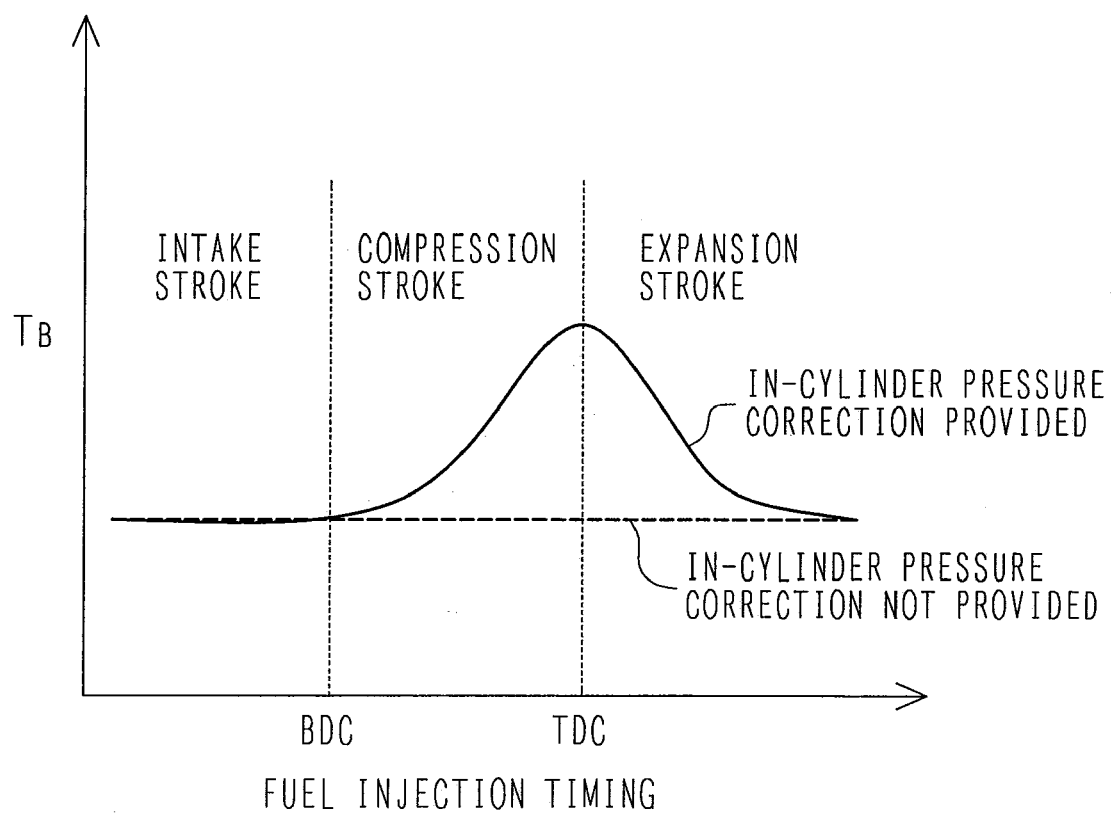
FIG. 16 shows the relationship between the first injector pulse width prevailing after startup and fuel injection timing in accordance with an embodiment of the present invention.

FIG. 16 shows the relationship between the first injector drive pulse width prevailing after startup and fuel injection timing in a situation where in-cylinder pressure compensation is provided. In the case of intake stroke injection, the in-cylinder pressure is not compensated for because it is equal to atmospheric pressure. In the case of compression stroke injection, however, the fuel pulse width increases in accordance with the in-cylinder pressure. Therefore, normal operations of the fuel control section can be verified by measuring the fuel injection pulse signal timing and pulse width.

Fourth Embodiment

A malfunction judgment method based on a correction amount and homo-elasticity coefficient will now be described with reference to FIGS. 17 to 19.

Figure 17:
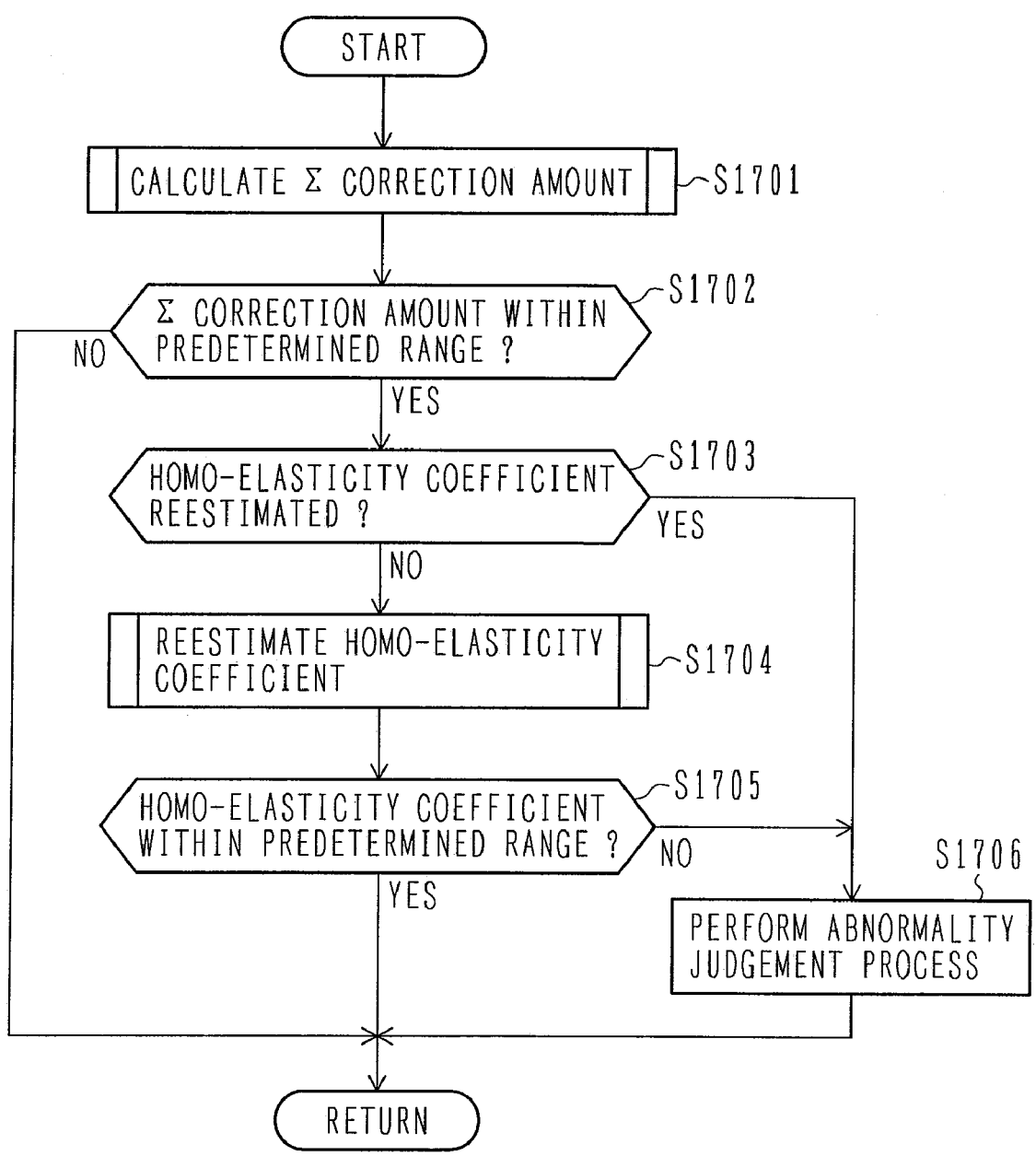
FIG. 17 is a typical flowchart illustrating an malfunction judgment process.
Figure 18:
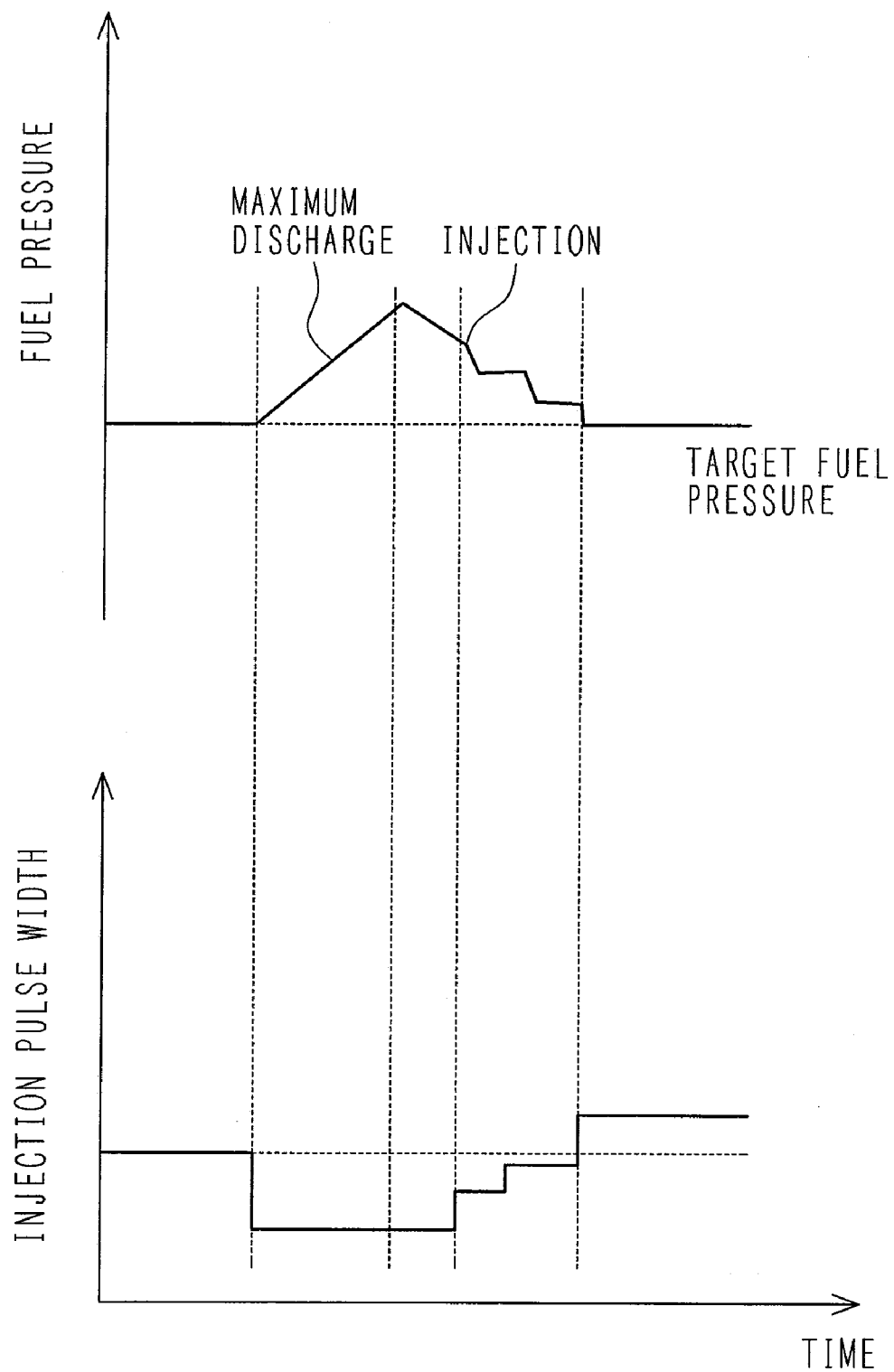
FIG. 18 illustrates fuel pressure and fuel injection pulse width that prevail while a homo-elasticity coefficient is being reestimated.

FIG. 17 is a flowchart illustrating a malfunction judgment process. Step S1701 is performed to calculate a Σ correction amount. If the Σ correction amount is obtained, for instance, by performing an addition for each of predetermined number of cam revolutions, it can be used for malfunction judgment based on estimated fuel pressure and measured fuel pressure. The predetermined number of cam revolutions may be the number of revolutions required for injection in all cylinders or the number of revolutions required for injecting a specific amount of fuel. Step S1702 is performed to judge whether the Σ correction amount is within a predetermined range that is defined according to injection and discharge dispersion. If the Σ correction amount is within the predetermined range, the flow concludes that no malfunction exist, and then skips the subsequent steps. If, on the other hand, the Σ correction amount is not within the predetermined range, the flow proceeds to step S1703. Step S1703 is performed to judge whether the homo-elasticity coefficient was reestimated (as described later) a predetermined period of time ago (predetermined number of injections, predetermined amount of injection, etc.). If the homo-elasticity coefficient was reestimated, the flow proceeds to step S1706. If not, the flow proceeds to step S1704. Step S1704 is performed to reestimate the homo-elasticity coefficient.

An example of a method of reestimating the homo-elasticity coefficient will now be described with reference to FIG. 18. FIG. 18 illustrates fuel pressure and fuel injection pulse width that prevail while the homo-elasticity coefficient is being reestimated. The homo-elasticity coefficient is reestimated in an idle state where the cam revolving speed is low. For homo-elasticity coefficient reestimation, at least one pump discharge operation is performed by using a value not smaller than predetermined value (so as to provide maximum discharge preferably) (reestimation operation), and the homo-elasticity coefficient is reestimated in accordance with the resulting pressure change. The method for reestimating the homo-elasticity coefficient is not described here because the homo-elasticity coefficient can be estimated by using a method according to any one of the foregoing embodiments. Further, whether the homo-elasticity coefficient could be reestimated can be determined by measuring the fuel injection pulse width before and after a reestimation operation. The reason is that fuel pulse widths measured before and after reestimation differ depending on the homo-elasticity coefficient estimation result even when the same target fuel pressure is adopted. In conjunction with homo-elasticity coefficient reestimation, if the Σ correction amount is outside the predetermined range, the homo-elasticity coefficient may be corrected in accordance with the fuel temperature or water temperature so that the estimated fuel pressure approximates to the measured fuel pressure.

Returning to FIG. 17, step S1705 is performed to judge whether the reestimation result is within the predetermined range. If the reestimation result is within the predetermined range, the flow terminates the process. If not, the flow proceeds to step S1706. In step S1706, the malfunction judgment process is performed.

Figure 19:
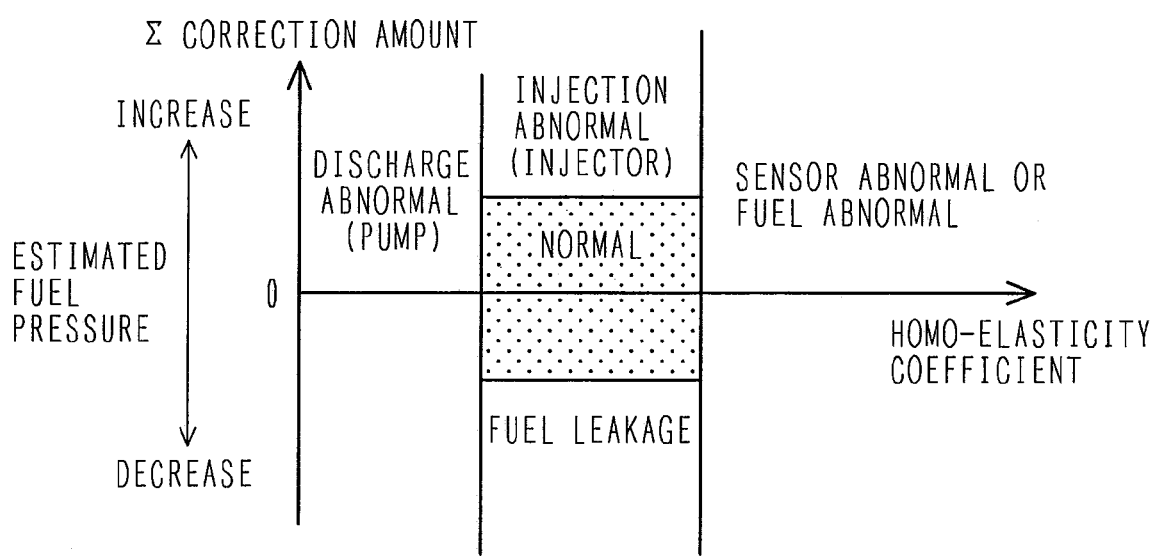
FIG. 19 shows an example of a method of performing the malfunction judgment process.

FIG. 19 shows an example of a method of performing the malfunction judgment process in step S1706. When the homo-elasticity coefficient is below a normal range, it is judged that a discharge malfunction exists. For example, a decrease in the discharge amount of a low-pressure pump, a clogged fuel filter in a low-pressure pipe, and a faulty high-pressure pump valve may be regarded as typical failure modes. A warning may be issued to prompt for the check of such failure modes. If, on the other hand, the homo-elasticity coefficient is above the normal range, it is judged that a fuel pressure sensor malfunction or fuel malfunction exists. For example, a noise entry into the fuel pressure sensor, a faulty fuel pressure sensor gain, and an erroneous mixture of fuel and water or other liquid having an unduly high homo-elasticity coefficient may be regarded as typical failure modes. A warning may be issued to prompt for the check of such failure modes. If the Σ correction amount is shifted toward a plus (+) side and displaced out of a normal range while the homo-elasticity coefficient is within the normal range, it is judged that a fuel injection malfunction exists. In this instance, it is conceivable that the injector may be clogged. Therefore, a warning may be issued to prompt for the check of the injector or control may be exercised to unclog the injector (e.g., by injecting the fuel at high pressure). If, on the other hand, the Σ correction amount is shifted toward a minus (−) side and displaced out of the normal range while the homo-elasticity coefficient is within the normal range, it is judged that fuel leakage has occurred. For example, leakage from a high-pressure fuel pipe joint and leakage from a seal section of the injector or fuel pump may be regarded as typical failure modes. A warning may be issued to prompt for the check of such failure modes. Further, safe control may be exercised to avoid increased leakage by lowering the fuel pressure from its normal level.

What is claimed is:

1. A control device comprising:
   a fuel injection control section for controlling an injector, which injects fuel stored in a fuel rail which stores fuel pressure-fed from a high-pressure pump,
   wherein said fuel injection control section comprises
      homo-elasticity coefficient calculation means for calculating a homo-elasticity coefficient in accordance with a pressure change in the fuel rail, which is brought about by fuel discharge from the high-pressure pump,
      fuel pressure estimation means for estimating pressure within the fuel rail in accordance with the homo-elasticity coefficient, and
      fuel control means for calculating an injector pulse width in accordance with the pressure estimated by said fuel pressure estimation means and outputting an injector drive pulse to the injector in accordance with the calculated injector pulse width.

2. The control device according to claim 1, wherein said homo-elasticity coefficient calculation means estimates the homo-elasticity coefficient when a fuel discharge amount of the high-pressure pump is not smaller than a predetermined value.

3. The control device according to claim 2, wherein the predetermined value is close to a maximum discharge amount of the high-pressure pump.

4. The control device according to claim 1, wherein said homo-elasticity coefficient calculation means estimates the homo-elasticity coefficient when a cam for driving the high-pressure pump is rotating at a speed not higher than a predetermined speed.

5. The control device according to claim 1, wherein said homo-elasticity coefficient calculation means comprises leak amount calculation means for calculating the amount of fuel leakage from the high-pressure pump by using at least one of the angle of a cam for driving the high-pressure pump, the crank angle of an engine which coordinates with the cam, fuel temperature, engine water temperature, and the pressure within the fuel rail.

6. The control device according to claim 1, wherein said fuel control means comprised in-cylinder pressure estimation means for estimating the engine's in-cylinder pressure prevailing during fuel injection from at least one of an intake air amount, an engine speed, and fuel injection timing, and calculates an injection pulse of the injector in accordance with the in-cylinder pressure.

7. The control device according to claim 1, further comprising:
   correction amount computation means which calculates a correction amount for correcting pressure which is estimated by said fuel pressure estimation means in accordance with the pressure estimated by said fuel pressure estimation means and the pressure within the fuel rail.

8. The control device according to claim 7, further comprising:
   homo-elasticity coefficient correction means for correcting the homo-elasticity coefficient so as to decrease an integrated value of the correction amount when the integrated value of the correction amount is outside a predetermined range.

9. The control device according to claim 7, further comprising:
   homo-elasticity coefficient estimation means for reestimating the homo-elasticity coefficient during idling when the integrated value of the correction amount is outside the predetermined range.

10. The control device according to claim 9, further comprising:
    malfunction judgment means which, when the homo-elasticity coefficient is outside the predetermined range, judges that a high-pressure fuel system is abnormal.

11. The control device according to claim 9, further comprising:
    malfunction judgment means which, when the integrated value of the correction amount is outside the predetermined range after the homo-elasticity coefficient is corrected by said homo-elasticity coefficient correction means, judges that the high-pressure fuel system is abnormal.

12. The control device according to claim 1, wherein the fuel control means sets a target fuel amount which determines the injector pulse width in accordance with the homo-elasticity coefficient.

13. A high-pressure fuel system control device which includes a high-pressure pump for pressurizing fuel and discharging the pressurized fuel to a fuel rail, an injector for injecting the fuel stored in the fuel rail, and a fuel pressure sensor for measuring the pressure of the fuel stored in the fuel rail, and controls the high-pressure pump and the injector in accordance with an output generated from the fuel pressure sensor, the high-pressure fuel system control device comprising:
    homo-elasticity coefficient estimation means for estimating a homo-elasticity coefficient of fuel in accordance with a pressure change which occurs when a fuel discharge amount of the high-pressure pump is not smaller than a predetermined value;
    fuel pressure estimation means for estimating fuel pressure within the fuel rail in accordance with the homo-elasticity coefficient and control target values for the high-pressure pump and the injector; and fuel control means for correcting an injection pulse of the injector in accordance with the fuel pressure estimated by said fuel pressure estimation means.

14. A high-pressure fuel system control device which includes a high-pressure pump for pressurizing fuel and discharging the pressurized fuel to a fuel rail, an injector for injecting the fuel stored in the fuel rail, and a fuel pressure sensor for measuring the pressure of the fuel stored in the fuel rail, and controls the high-pressure pump and the injector in accordance with an output generated from the fuel pressure sensor, the high-pressure fuel system control device comprising:

homo-elasticity coefficient estimation means for estimating a homo-elasticity coefficient of fuel in accordance with a pressure change which occurs when a fuel discharge amount of the high-pressure pump is not smaller than a predetermined value;

fuel pressure estimation means for estimating fuel pressure within the fuel rail in accordance with the homo-elasticity coefficient and control target values for the high-pressure pump and the injector;

correction amount computation means which computes a correction amount for correcting a fuel amount integrated value of said fuel pressure estimation means in accordance with the fuel pressure estimated by said fuel pressure estimation means and the pressure measured by the fuel pressure sensor; and fuel control means for controlling the high-pressure pump and the injector in accordance with the fuel pressure estimated by said fuel pressure estimation means.

* * * * *